United States Patent [19]
Taylor et al.

[11] Patent Number: 5,149,341
[45] Date of Patent: Sep. 22, 1992

[54] PAPER COATER SKIP PREVENTION AND DEAERATION APPARATUS AND METHOD

[76] Inventors: John A. Taylor; Paul J. Caryk, both of c/o The Black Clawson Company, 46 N. First St., Fulton, N.Y. 13069

[21] Appl. No.: 748,864

[22] Filed: Aug. 23, 1991

[51] Int. Cl.$^5$ ............................................. B01D 45/12
[52] U.S. Cl. ........................................ 55/36; 55/203; 55/456; 55/457; 55/348; 118/603; 118/610
[58] Field of Search .................... 118/603, 610; 55/36, 55/46, 51, 52, 55, 203, 456, 457, 348

[56] References Cited

U.S. PATENT DOCUMENTS

| | | | |
|---|---|---|---|
| 2,346,005 | 4/1944 | Bryson | 55/456 |
| 2,571,503 | 10/1951 | Underwood | 55/203 |
| 2,645,346 | 7/1953 | Staege et al. | 209/211 |
| 2,647,588 | 4/1953 | Miller | 55/348 |
| 2,706,045 | 4/1955 | Large | 209/211 |
| 3,161,490 | 12/1964 | Dudek | 55/205 |
| 3,163,508 | 12/1964 | Tuck et al. | 55/46 |
| 3,915,679 | 10/1975 | Roach et al. | 55/348 |
| 4,199,332 | 4/1980 | Krohn et al. | 55/203 |
| 4,548,622 | 10/1985 | Suzuki et al. | 55/204 |
| 4,564,443 | 1/1986 | Bliss | 209/211 |
| 4,643,746 | 2/1987 | Suzuki et al. | 55/204 |
| 4,662,908 | 5/1987 | Suzuki et al. | 55/204 |
| 4,987,864 | 1/1991 | Sakai et al. | 55/190 |

FOREIGN PATENT DOCUMENTS 953601 10/1955 Fed. Rep. of Germany.

Primary Examiner—Bernard Nozick
Attorney, Agent, or Firm—Biebel & French

[57] ABSTRACT

Deaeration apparatus for removing entrained air from liquid paper coating and method includes a cylindrical vortex tube which has an inlet end with a vortex generator insert formed with helical flighting surrounding a solid center shaft. The flighting has an outer diameter which is proportioned to be received in the tube inlet and causes a vortex flow to the coating material. A rejects conduit is positioned in the outlet end of the vortex tube with an opening which faces the vortex generator insert and which is positioned on the axial center of the tube and spaced from the vortex generator. The entrained gas forms as bubbles on the vortex generator shaft and form a column immediately downstream of the insert so that the base of the column is at the inner end of the generator shaft and extends toward and into the rejects conduit. The very small bubbles are also carried by the mass flow of the coating toward the outlet end of the tube and into the open end of the reject conduit. The deaerated liquid flows through the tube outlet which surrounds the reject conduit. A deaeration system is disclosed which includes a housing containing a plurality of the individual vortex tubes arranged in flow parallel to each other with common inlet and outlet manifolds.

6 Claims, 3 Drawing Sheets

PAPER COATER SKIP PREVENTION AND DEAERATION APPARATUS AND METHOD

BACKGROUND OF THE INVENTION

This invention relates to the art of paper coating, and more particularly to method and apparatus by which the size and quantity of entrained bubbles are controlled in the coating liquid with the lowest practical pressure drop and with a low reject rate.

Such coatings which can be troubled by gas entrainment include mineral pigmented printing coating, general purpose clay coatings, coating for thermal and facsimile machines, and other specialty aqueous and solvent-based coatings.

Gas entrainment in coating liquids has several deleterious effects on the practice of coating. It prevents the practice of the jet coating method by causing coating skips or requires an excessively high recirculation rate to overcome the problem. It creates small coating voids in the final product. It can cause the coating to be discarded when the gas concentration is too high for good coating flow. In addition to requiring a high recirculation rate, the current air removal devices induce a high pressure drop and require a high reject rate, further increasing the capital and operating costs of the coating system.

Large bubbles can bridge the orifice slot of the coater, and cause a skip in the coating. The coating station operator is forced to increase the width of the die lips or the orifice slot so that it will pass the largest expected entrained bubble without creating a void in the shot flow. However, this results in the application of a heavier coating, and the requires the doctoring off of a larger percentage of the coating. This coating is returned for reuse, and the handling increasing the coating gas content. The excess coating also loads the doctor blade system. Inevitably, more coating material is used, and later discarded when it is no longer practical to separate the gas. Smaller bubbles which pass the die lips can also pass under the doctor blade, and cause a void defect in the paper.

Gas of any kind, but particularly in the form of a large quantity of very small gas bubbles, also is detrimental to the quality of the coating. While small bubbles, also known as microbubbles, can pass the die and blade without localized adverse effects, they unbalance the rheology and change the viscosity of the coating. The coating weight and quality suffer. As noted above, when the coating becomes laden, the coating material may become useless.

The paper converting and coating industry has addressed these problems in a number of manners, including the design and use of cyclone or vortex type centrifugal separator systems, with some success. However, in such systems, certain problems persist. These problems include high pressure drops or a sudden onset of failure at certain upper limit flow rates or high reject rates. Such systems require a detailed knowledge of the anticipated flow rates. These excess rejection rate in the separator, excess pressure drop, and an inability to extract fine bubbles consistently or at all, have been typical. Low efficiency of bubble separation translates into low production rates and/or high costs for excess pumping capacity and wasted coating material.

SUMMARY OF THE INVENTION

The invention is directed to a cyclone or vortex separator and method especially adapted for the removal of entrained gas from highly viscous fluids, such as paper coatings with systems of high efficiency and low back pressure. The coating enters the inlet end of a vortex tube, and is forced to spiral by a vortex generator in the form of a helical or spiral baffle.

The centrifugal force of the swirling coating creates a pressure gradient that decreases toward the center of the tube. A plot of this pressure gradient is nearly constant over the length of the tube. Since a bubble occupies a space in the pressure gradient, it has a higher pressure on one side than on the other, and since it can not maintain an internal pressure difference, it moves toward the tube center forming a gas reject column. A gas reject phase pickup conduit is centered in the opposite outlet end of the tube with an opening which faces the inlet end, and extracts the bubbles along with some coating, thereby leaving an annulus of essentially bubble-free material.

The vortex generator has a helical flighting extending radially out of a center shaft to induce a rotating movement to liquid coating materials flowing therethrough. It is removably positioned within the inlet end of the tube, and the outer circumference of the flighting forms a sealing fit with an inside diameter of the tube. The separator tube has an overall L/D ratio of about 5/1 to about 8/1.

The location of the pick-up conduit at the downstream end of the tube provides several advantages. First, no flow reversal is required for the collection of the gas-rich phase. This provides an increase in efficiency over prior arrangements which extract the gas at the inlet end by flow reversal. Second, the arrangement permits the internal flow to settle, the turbulence to abate, and the flow to become laminar and stable. This is accomplished within the L/D ratio, with a significant reduction in space required to center the unwanted gas reject phase in the tube.

When the bubbles are confined to a tight space, the required overall reject flow rate may be reduced. The "accepts" or bubble-free liquid flows through the annulus defining the tube outlet. This is a region of higher pressure drop, and the arrangement permits this region to be kept to a minimum, by keeping the reject conduit short and of small diameter. The entrance of the pickup conduit is dimensioned only sufficiently large to accept the gas reject phase and be small enough to limit the outflow quantity of good coating and reduce back pressure at the annulus between the pickup conduit and the inside wall of the separator tube.

The spiral baffle configuration of the vortex generator is a preferred construction, and contributes to the high efficiency of the separator. It provides a large flow open area for its size, with reduced pressure drop, and a relatively lower tendency to induce turbulence over the tangential inlets used in prior devices. The pitch of the flighting can be radially changed or tailored to the fluid rheology and bubble size requirements, while maintaining a common exterior design for all applications.

As previously noted, a gas reject column is formed within the tube, the base of which tends to contain the larger bubbles beginning immediately above the end of the generator center shaft. This column has a variable or varying diameter where first forming at the immediate end of the vortex generator, like a twisted rope, then becomes more uniform as it approaches the inlet opening of the conduit. The very small bubbles, known as microbubbles, tend to fall into the column more toward the outlet end, and become a part of the gas column. Since they are carried by the mass flow through the tube, they are effectively collected at the reject conduit, so that a concentrated microbubble rich mix is withdrawn through the pickup conduit along with the discrete larger bubbles.

Another distinctive feature of the separator of this invention resides in the use of a gas collector conduit positioned in an outlet end of the generator conduit and formed with an open and unobstructed collection end on the axial center of the vortex conduit. The axial length of the separator is no longer than necessary for the flow to stabilize therein, providing an length-to-diameter ratio as previously mentioned and resulting in minimum pressure loss.

A coater gas separator system may be formed with an inlet manifold, a plurality of identical vortex separators, and an good coating outlet manifold, with the vortex separator/tubes in flow parallel to each other. A pump takes liquid coating material from a storage container and applies it under pressure to the intake manifold, while the gas-free coating is carried from the outlet manifold to the coater inlet. The gas rich reject fraction is drawn off the pickup conduits through throttling or flow control valve and returned to a holding tank or to the main supply.

A particular object and advantage of the separator according to this invention resides in the fact that little excess of coating is withdrawn through the pickup conduit over that which is necessary to capture the bubbles together with the microbubble stream.

Another object of the invention is the provision of a skip prevention system and method for a paper coater in which deaeration apparatus has high efficiency of gas removal and low back pressure.

Another object of the invention is the provision of a vortex separator for removing air and other gasses from liquid coating, in which a screw-type flighting leads the coating into a vortex tube at an inlet end, and in which the separated liquid and gas phases are withdrawn from an outlet end.

A still further object of the invention is the provision of a deaeration system and method for a paper coater in which the larger bubbles are coalesced into a common gas region in a vortex separator on a central axis in common with a microbubble region and carried, without flow reversal, to a common reject pickup.

These and other objects and advantages of the invention will be apparent from the following description, the accompanying drawings and the appended claims.

DESCRIPTION OF PREFERRED EMBODIMENT

Figure 1:
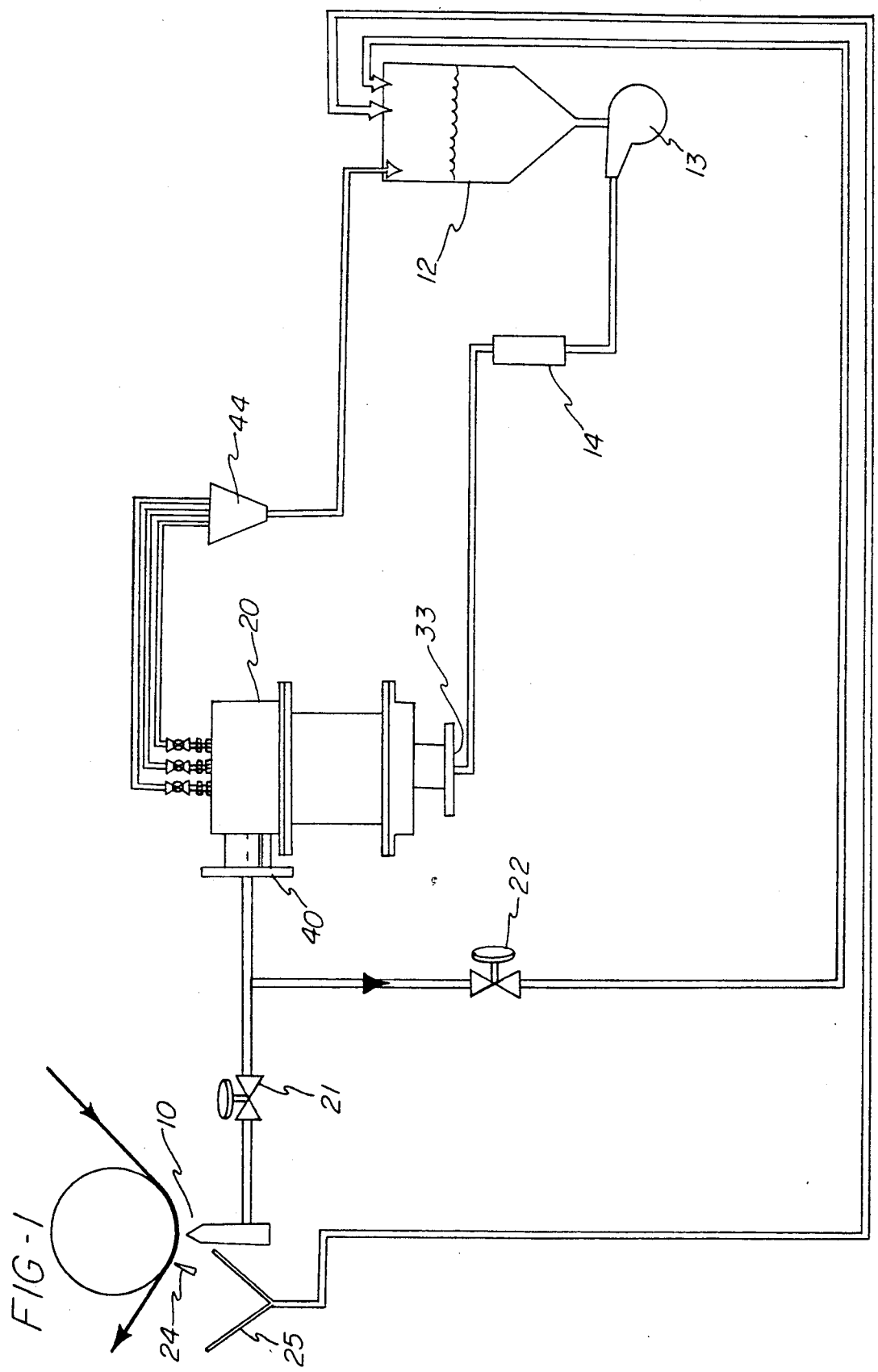
FIG. 1 is a diagram of a paper coating system employing deaeration apparatus according to this invention.

Referring to the figures of the drawing which illustrate a preferred embodiment of the invention, a deaeration system for a paper coater according to this invention is diagrammatically illustrated in FIG. 1. The coating system includes a coater 10, which may be a "VariDwell" type blade coater as manufactured by The Black Clawson Company, and as described in U.S. Pat. Nos. 3,301,214; 3,609,810, RE 31,695; 3,187,718; 3,882,817 and 4,231,318.

A typical coater system is illustrated in FIG. 1 in which a tank 12 contains a source of liquid paper coating material, such as a starch and clay material, which contains entrained gas, such as air. A pump 13 is connected to withdraw coating from the tank 12 for application to the coater 10, through a filter 14 and a deaeration device 20 in accordance with this invention. The flow from the deaeration device 20 may be controlled by control valves 21 leading to the coater 10 and a by-pass valve 22 leading back to the tank 12. The overflow from the coater head itself, as well as the excess material doctored off by the doctor blade 24 may be caught in a collector pan 25 and conventionally returned to the tank 12. Of course, this material contains with it a substantial quantity of entrained air, much of which cannot be readily separated merely by allowing the same to settle in the tank.

Figure 2:
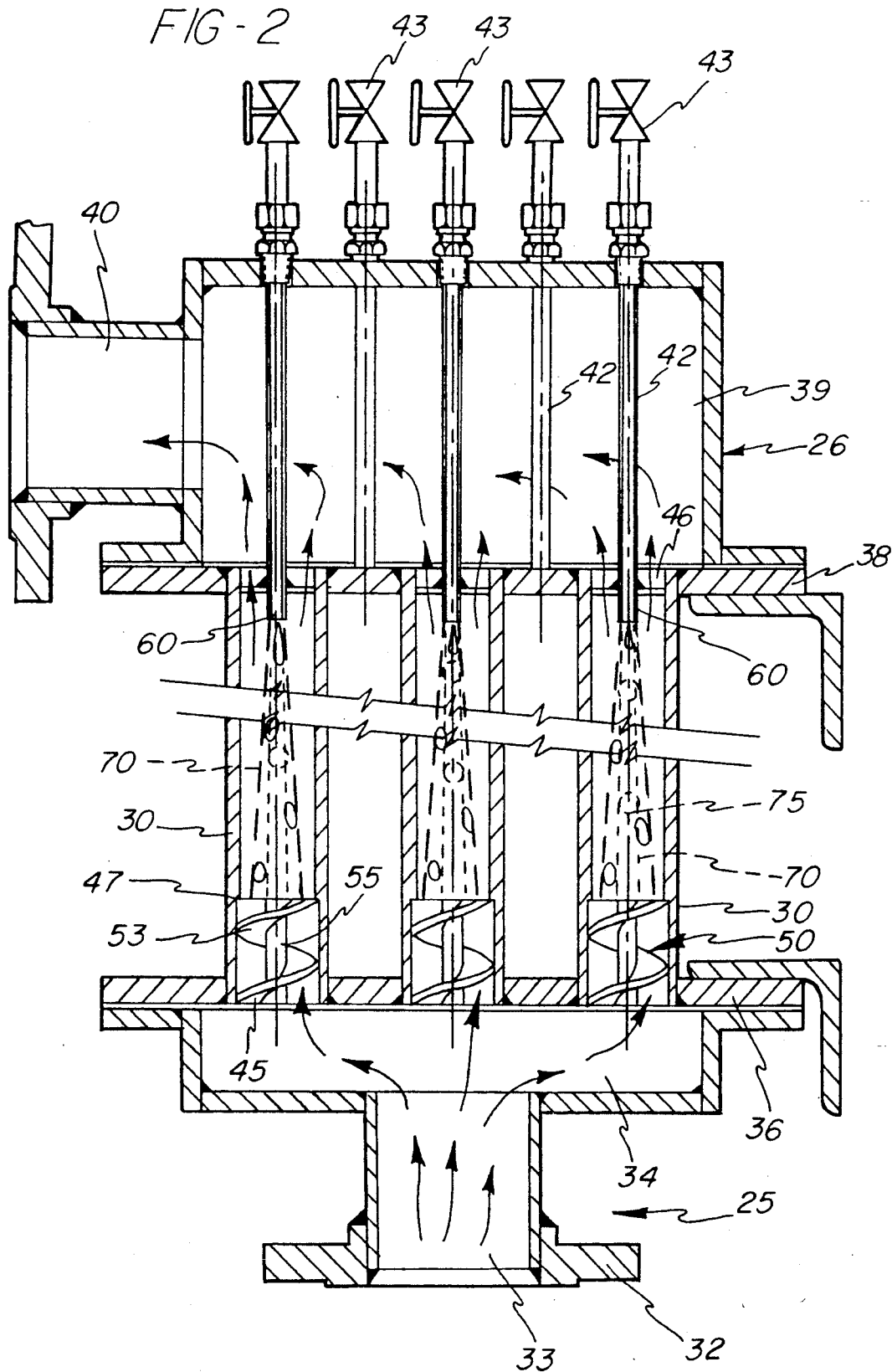
FIG. 2 is a vertical sectional view through a typical deaeration apparatus of this invention showing the employment of a plurality of parallel connected vortex tubes.
Figure 3:
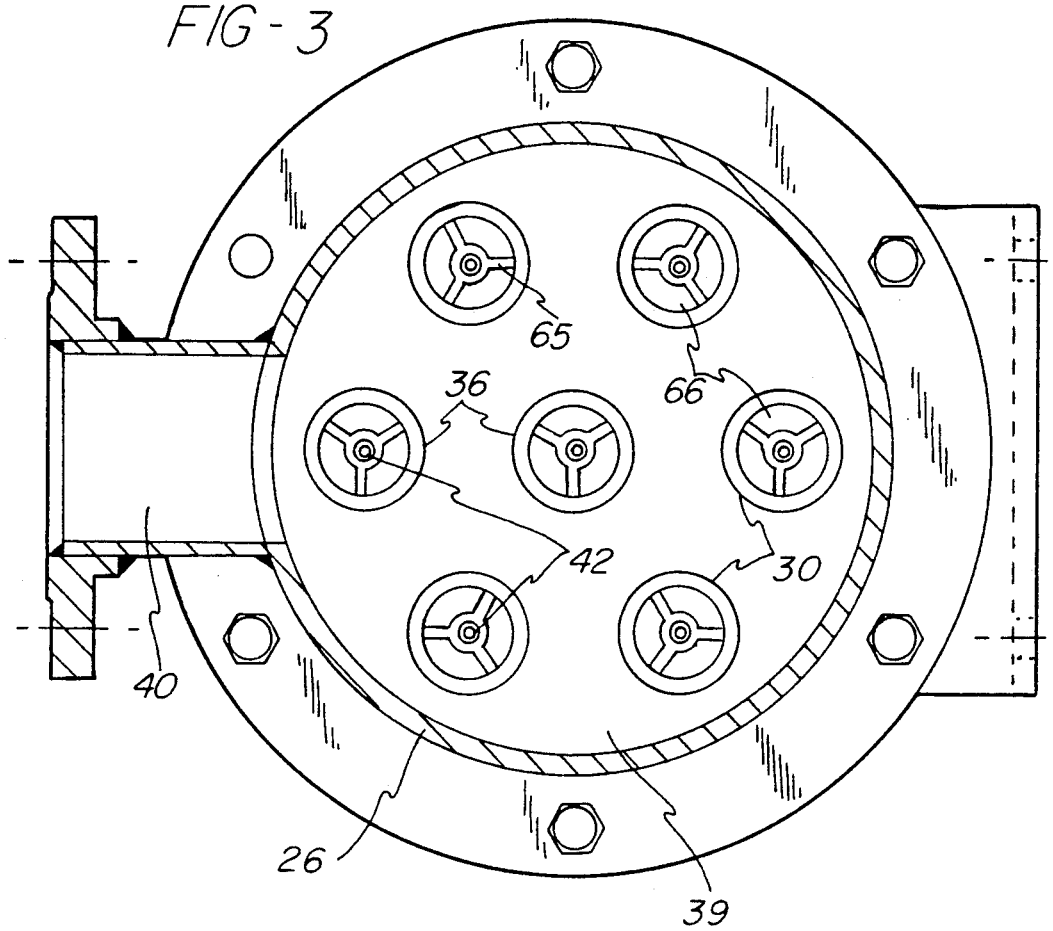
FIG. 3 is a view of the separator apparatus with the top removed to expose the tops of the vortex tube.

FIG. 2 represents a vertical section through a typical deaeration apparatus 20 in accordance with this invention. The apparatus 20 includes a housing divided generally into a lower section 25 and an upper housing section 26, in which a plurality of individual vortex separator tubes 30 extend between the housing sections. The lower housing section 25 includes a fitting 32 defining a coating inlet 33 through which coating material to be deaerated enters from the pump 13 and filter 14. The inlet 33 opens into an inlet manifold portion 34 which is in common with the inlet ends of the respective vortex tubes 30. Preferably, depending upon the capacity of the system and the demands of the coater, a plurality of vortex tubes are used in flow parallel. In FIG. 2, and also as illustrated in FIG. 3, a plurality of seven identical vortex tubes 30 are disclosed, extending between the housing sections 25 and 26.

The lower housing section 25 is, at the intake manifold 34, is closed by an upper plate 36 into which the lower ends of the vortex tubes 30 are extended and sealed, to receive coating from the manifold 34. The upper housing or body section 26 is similarly provided with a lower plate 38 through which the upper ends of the vortex tubes 30 are extended, for discharge into an outlet manifold 39 and a deaeration apparatus common outlet 40.

Individual reject conduits 42, described hereinafter in greater detail, extend through the manifold 38, to flow control valves 43. The lower ends of the reject conduits 42 extend into the interior of the upper or exit ends of the tubes 30, and provide a path by which a gas-laden or gas-rich mixture fraction is withdrawn from the coating, as described hereinafter in greater detail. The outlets of the valves 43 connect to a collection vessel 44 which empties into the supply tank 12.

The heart of the deaeration apparatus 20 comprises the individual vortex tubes 30, with an inlet end 45 opening into the inlet manifold 34 and an outlet end 46 opening into the outlet manifold 39. Each of the tubes 30 may be identical in construction and are in flow parallel when mounted within the apparatus 20.

Each of the tubes 30 has a vortex generator in the form of an insert 50 at the inlet end. The vortex insert or generator 50 is a short section of screw-type flighting which is removably received within the inlet end 45 of the tube 30 and has an end received against a shoulder 47 of the tube, for defining an accurate location of the vortex generator.

The generator 50 has a helical flighting 53 which extends radially from a solid center shaft 55. The outer circumference of the flighting 53 defines a circle or, more accurately, a cylinder which is closely fitted within the inside walls of the tube 30, so that all of the coating liquid applied to the inlet end must follow the spiral space between the flighting for exit into the interior of the tube 30. Preferably, the geneator 50 has more than one turn of the flighting and preferably has approximately 1½ to 2 turns as shown.

The generator 50 may be considered as a spiral baffle or a section of screw flighting which defines, with the inside wall of the tube 30, a the spiral inlet opening which provides angular acceleration to the flow of the coating liquid therethrough, thereby creating a centrifugal force and a vortex action to the coating material as it enters the interior of the tube 30. In a typical example, the pitch of the flighting may be approximately 0.55 lead/diameter, while the center shaft 55 has a diameter which is about 25% or less than the diameter of the flighting.

Figure 4:
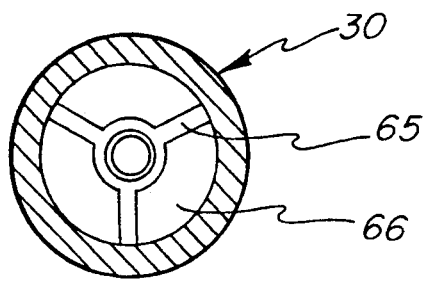
FIG. 4 is an enlarged view of the top end of a vortex tube showing the extraction conduit in section and the centering spider.

The inner ends of the reject conduits are extended somewhat into the interior of the tubes 30, as illustrated at 60. The inner end defines an inlet opening which is in facing relation to the end of the generator insert 30, and is precisely positioned on the axial center of the tube by a location spider 65, best illustrated in FIG. 4. Preferably, the spider 65 has three equally spaced legs which locate and retain the inner end 60 of the conduit 42 and define open spaces 66 therebetween for outflow of de-aerated coating material through the tube outlet 46.

While the spacing between the end of the vortex generator 30 and the inlet end 60 of the conduit 42 is not critical, it must be sufficient to permit the vortex to stabilize within the tube 30. Excess generator tube length is avoided as it contributes to increase in back pressure, and accordingly, loss and efficiency.

For a 1 inch diameter tube 30, a spacing of from 4–6 inches between the inner end of the insert 30 and the inlet end of the tube 42 has been found to be satisfactory, as an example. The overall length to diameter ratio of the vortex tubes 30, including the generator insert 50, may be in the order of about 5:1 to 8:1, as an example, and the tube may have a diameter from about ¾" to 2 inches.

The center shaft 55 of the vortex generator 50 assists in the collection of bubbles from the liquid coating material. After about one turn or revolution of the flighting 53, the bubbles begin to coalesce and collect on the outer surface of the center shaft 55. As the bubbles leave the generator, they tend to coalesce into a common gas column or core 70 having a base at the immediate end of the insert 30 in axial alignment with the shaft 55. The gas column 70 may extend with an apex or tip toward or into the inlet end 60 of the conduit 42. This gas column 70 settles on the axial center of the vortex tube 30 and tends to remain relatively stable at the portion thereof as it enters the opening of the conduit 42.

As additional bubbles of gas enter into the column 70, and if the envelope defined by the column 70 does not extend into the conduit 42, and gas bubbles are released from the apex or tip of the column 70 and progress along the axis to the inlet end 60 of the conduit 42. Such discrete gas bubbles tend to be of a specific size, and are carried along the length of the tube 30 by reason of the mass flow of coating from the inlet end 45 to the outlet end 46. The inlet end 60 of the reject-receiving conduit 42 is particularly sized to accept such discrete bubbles. Where there is sufficient gas to form a column 70 which extends to the conduit 42, it is taken by the flow into the inlet end 60. In the example given above, a conduit tube 42 having an inlet opening ⅜" in diameter has been found to provide satisfactory results with a one inch diameter vortex tube 30.

As previously described, the very small microbubbles, which do not themselves produce skip, nevertheless tend to collect in a concentrated region on the axis of the vortex tube 30. Since there is no reversal of flow within the tube, as is common with other air separation devices, these small bubbles move along with the mass flow and are, to a large extent, accepted within the opening 60 of the reject conduit 42 along with the larger discrete bubble 75. The heavily air-laden material collected from the conduits 42 may not necessarily be directly returned to the tank 12, but rather, may be diverted to the holding tank 44 in order to allow for gravitational separation of the light and heavy fractions in time, to permit the return of a heavier or clearer bubble-free fraction to the body of the supply.

Due to the relatively low back pressure of the individual vortex tubes 30, the coating supply system of this invention need not be operated at relatively high pressures. Typically, the pump 13 may deliver the liquid coating material to the inlet 33 at about 20 psi, providing a flow rate through the individual cells or vortex tubes of about 15 gallons per minute.

The deaerated coating phase leaving through the outlet end 46 between the legs of the spider 65, in the spaces 66, is essentially free of any entrained bubbles which could cause a skip at the coater, and is also relatively free of the smaller non-skip producing bubbles, such as micro bubbles. Since flow reversal does not occur in the tubes 30, substantially increasing the inlet pressure will result in an increased flow rate and separation efficiency, as opposed to a catastrophic breakdown or failure of the separation process as is typical in the case of cyclone or vortex separation devices which have a reverse extraction or reverse flow, that is, those in which the lighter fraction is taken out in an axial direction which differs from the direction of extraction of the heavier fraction.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. The method of deaerating paper coating liquid prior to the application of said liquid to a coater, comprising the steps of:
   applying under pressure a coating liquid to be treated to an axial flow cylindrical separator tube having a vortex generator at the inlet end in the form of a helical flighting surrounding a solid center shaft and causing the gas bubbles to coalesce in said tube into a conical gas region, the base of which is adjacent the end of said flighting and the tip of which extends toward an opposite outlet end of said tube, providing in said tube a gas pickup conduit at said tube outlet end spaced from said conical gas region and positioned with an open end facing said flighting and on the axial center of said tube, causing said coating liquid to pass through said generator from said inlet end through said flighting to said outlet end at a rate sufficient to cause discrete bubbles to be separated from said gas region and carried by the flow from said inlet toward said outlet end into said conduit, withdrawing a gas-rich fraction through said conduit, and withdrawing deaerated coating liquid from said outlet end for delivery to said coater.

2. The method of deaerating a paper coating liquid during passage thereof through a piping line to a coater, comprising the steps of:

installing in said line an axial flow cylindrical vortex tube having inlet and outlet ends and having a vortex generator at said inlet end in the form of helical flighting of uniform radius surrounding a imperforate center shaft, said tube also having at said outlet end thereof a gas pick-up conduit having an open end spaced from and facing said flighting on the axial center of said shaft, forcing said coating liquid to flow through said tube from said inlet end to said outlet end at a velocity which causes gas bubbles in said liquid to coalesce into a generally conical gas region the base of which is adjacent the end of said shaft and the tip of which extends toward said outlet end of said tube, and also causes discrete bubbles to be separated from said region and carried by the flow through said tube from said inlet end toward said outlet end, withdrawing a gas-rich fraction from said conduit, and causing the remaining said coating liquid to flow from said outlet end of said tube toward said coater.

3. In a paper coating system including a coater, a source of liquid paper coating material containing entrained gas, and a pump connected to said source, the improvement in deaeration apparatus for removing such gas from said coating material, comprising:

a cylindrical tube having an inlet end and an outlet end, means at said inlet end forming a vortex generator, said generator having a helical flighting formed with at least one turn extending radially from a center shaft, a gas pickup conduit having a diameter substantially less than the inside diameter of said tube, means supporting said conduit at said tube outlet end with an open end of said conduit facing said generator and positioned on the axial center of said tube in spaced relation to said insert defining an open space therebetween, means between said conduit and said tube forming a tube coating material outlet annulus, means for applying liquid coating under pressure from said pump to said generator between said flighting and said shaft for flow through said flighting into the interior of said tube such that the entrained gas forms a cone-shaped gas region in said open space with the base of said gas region at the inner end of said shaft, said conduit open end having an inside diameter sufficient to receive gas bubbles which are released from the apex of said gas region and are carried by the flow of coating material toward said tube outlet end, means connecting said tube outlet to supply coating materials which are deaerated to said coater, and means for receiving a gas laden coating material fraction from said conduit.

4. The system of claim 3 in which said generator flighting extends about 1½ turns.

5. The system of claim 3 in which the length to diameter ratio of said tube including said generator is from 5:1 to 8:1.

6. The system of claim 5 in which said tube is about one inch in inside diameter.

* * * * *